United States Patent
Steed et al.

(10) Patent No.: US 9,476,689 B2
(45) Date of Patent: Oct. 25, 2016

(54) WEAR INDICATION DEVICES, AND RELATED ASSEMBLIES AND METHODS

(71) Applicant: Dash LLC, West Valley City, UT (US)

(72) Inventors: Daniel J. Steed, West Valley City, UT (US); Shiloh D. Poulsen, Magna, UT (US)

(73) Assignee: Dash LLC, West Valley City, UT (US)

( * ) Notice: Subject to any disclaimer, the term of this patent is extended or adjusted under 35 U.S.C. 154(b) by 216 days.

(21) Appl. No.: 14/304,649

(22) Filed: Jun. 13, 2014

(65) Prior Publication Data

US 2015/0362306 A1   Dec. 17, 2015

(51) Int. Cl.
*G01B 7/02* (2006.01)
*B02C 17/22* (2006.01)

(52) U.S. Cl.
CPC ............. *G01B 7/02* (2013.01); *B02C 17/22* (2013.01); *B02C 2210/01* (2013.01)

(58) Field of Classification Search
CPC ....... B02C 13/31; B02C 17/22; B02C 17/00; B02C 13/28; B02C 13/2804; B02C 2210/01; B02C 2210/02; B02C 4/305; G01B 7/02; G05B 19/404; G05B 19/406; G05B 2219/37256; G05B 19/04
USPC .......... 324/700, 71.2, 699; 241/101.2, 101.3, 241/197, 300
See application file for complete search history.

(56) References Cited

U.S. PATENT DOCUMENTS

| | | | |
|---|---|---|---|
| 4,510,793 A | 4/1985 | Ploegaert et al. | |
| 6,208,128 B1 * | 3/2001 | Braconnier | G01B 7/06 324/700 |
| 6,386,237 B1 | 5/2002 | Chevalier et al. | |
| 7,113,125 B2 | 9/2006 | Le Sesne | |
| 7,172,144 B1 * | 2/2007 | Slater | B02C 17/1805 241/101.2 |
| 7,677,079 B2 | 3/2010 | Radziszewski et al. | |
| 8,384,266 B2 | 2/2013 | Fish et al. | |
| 2003/0175090 A1 | 9/2003 | Port-Robach | |
| 2007/0271804 A1 | 11/2007 | Kuhman et al. | |
| 2008/0023225 A1 | 1/2008 | Lynde et al. | |
| 2009/0061542 A1 * | 3/2009 | Patrick | G01N 27/20 438/10 |

(Continued)

FOREIGN PATENT DOCUMENTS

| | | |
|---|---|---|
| GB | 2015099 A | 9/1979 |
| GB | 2255145 A | 10/1992 |
| WO | 2006081610 A1 | 8/2006 |
| WO | 2007128068 A1 | 11/2007 |

OTHER PUBLICATIONS

International Search Report for International Application No. PCT/US2015/025132, dated Jul. 21, 2015, 3 pages.

(Continued)

*Primary Examiner* — Jermele M Hollington
*Assistant Examiner* — Robert P Alejnikov, Jr.
(74) *Attorney, Agent, or Firm* — TraskBritt

(57) ABSTRACT

A wear indication device comprises an outer body exhibiting at least one opening extending at least partially therethrough, and at least one sensor within the at least one opening. The at least one sensor comprises at least one probe, and at least one electronic device operatively associated with the at least one probe. The at least one electronic device comprises at least one power supply and at least one output device. An assembly, and a method of detecting wear to a component of an assembly are also described.

24 Claims, 5 Drawing Sheets

(56) References Cited

U.S. PATENT DOCUMENTS

2011/0037983 A1    2/2011 Davies
2012/0242355 A1*   9/2012 Kato .................... G01N 27/125
                                                          324/700

OTHER PUBLICATIONS

International Written Opinion for International Application No. PCT/US2015/025132, dated Jul. 21, 2015, 9 pages.

Global Business Reports, Chile Builds a Foundation for the Future—A resource-rich country deals with scarce commodities: energy, water and skilled labor., Engineering & Mining Journal, Apr. 2014, pp. 92-103.

Kouche et al., Ultrasonic Non-Destructive Testing (NDT) Using Wireless Sensor Networks, Procedia Computer Science, 10 (2012), pp. 136-143.

Steel et al., A Wireless Ultrasonic NDT Senor System, 16th WCNDT 2004—World Conference on NDT, Nov. 2014, vol. 9, No. 11, WCNDT 2004 Edition, 8 pages.

* cited by examiner

WEAR INDICATION DEVICES, AND RELATED ASSEMBLIES AND METHODS

TECHNICAL FIELD

The disclosure, in various embodiments, relates generally to devices, assemblies, and methods for use in processing a mined material, such as ore. More particularly, embodiments of the disclosure relate to wear indication devices, to assemblies including wear indication devices, and to methods of detecting wear to components of an assembly.

BACKGROUND

The mining industry frequently utilizes mills (e.g., rotary mills, ball mills, rod mills, semiautogenous mills, autogenous mills, etc.) to reduce the size of masses of material structures (e.g., ore) mined from the earthen formations. During use and operation of a mill, mined structures (and, optionally, other structures, such as balls, rods, etc.) are typically lifted and dropped back onto other mined structures to form relatively smaller structures through the resulting impacts. The process can be continuous, with relatively large mined material structures being delivered into one end of the mill and relatively smaller material structures (e.g., particles) of the mined material exiting an opposite end of the mill.

Generally, internal surfaces of a mill are covered (e.g., lined) with wear-resistant structures (e.g., liners, plates, etc.) sized and shaped to prevent damage to the mill resulting from contact between the mined material structures (and, optionally, other structures) and the internal surfaces of the mill during use and operation of the mill. The mined material structures contact and degrade (e.g., wear, abrade, etc.) the vicar-resistant structures rather than the internal surfaces of the mill. The wear-resistant structures may be attached to the internal surfaces of the mill by way of bolts, and may be detached and replaced upon exhibiting significant wear. Thus, the wear-resistant structures can prolong the durability and use of the mill.

Unfortunately, it is often difficult to determine, particularly when continuous processing is employed, when the wear-resistant structures need to be replaced. Since the wear-resistant structures are located within the mill, the amount of wear exhibited by the wear-resistant structures is generally not easy to ascertain. Typically, the mill must be periodically shut down, cleaned, and physically inspected to determine if the wear-resistant structures need to be replaced. However, as commercial-scale mills are usually quite large and process significant amounts of mined material per hour, periodically shutting down and cleaning the mill to determine the amount of wear exhibited by the wear-resistant structures can be quite costly, inefficient, and impractical.

Accordingly, there remains a need for new devices, assemblies, and methods facilitating the simple and efficient detection and communication of the amount of wear exhibited by wear-resistant structures during mill operations.

BRIEF SUMMARY

Embodiments described herein include wear indication devices, assemblies including wear indication devices, and methods of detecting wear to a component of an assembly. For example, in accordance with one embodiment described herein, a wear indication device comprises an outer body exhibiting at least one opening extending at least partially therethrough, and at least one sensor within the at least one opening. The at least one sensor comprises at least one probe, and at least one electronic device operatively associated with the at least one probe. The at least one electronic device comprises at least one power supply and at least one output device.

In additional embodiments, an assembly comprises a vessel comprising a shell, at least one structure covering at least one internal surface of the shell of the vessel, and one or more wear indication devices extending through and coupling the shell of the vessel and the at least one structure. Each of the one or more wear indication devices independently comprises an outer body exhibiting at least one opening extending at least partially therethrough, and at least one sensor within the at least one opening. The at least one sensor comprises at least one probe, and at least one electronic device operatively associated with the at least one probe. The at least one electronic device comprises at least one power supply and at least one output device.

In yet additional embodiments, a method of detecting wear to a component of an assembly comprises positioning at least one wear indication device within at least one opening extending through a shell of a vessel and at least one structure covering an internal surface of the shell. The at least one wear indication device comprises an outer body exhibiting at least one recess extending at least partially therethrough and at least one sensor within the at least one recess. The at least one sensor and comprises at least one probe and at least one electronic device operatively associated with the at least one probe. The at least one electronic device comprises at least one power supply and at least one output device. The at least one structure is at least partially attached to the vessel using the at least one wear indication device. A portion of the at least one wear indication device is removed responsive to at least one of physical degradation and chemical degradation incurred during processing of a material with the vessel. An output is produced with the at least one sensor of the at least one wear indication device after removing the portion of the at least one wear indication device.

DETAILED DESCRIPTION

Figure 1:
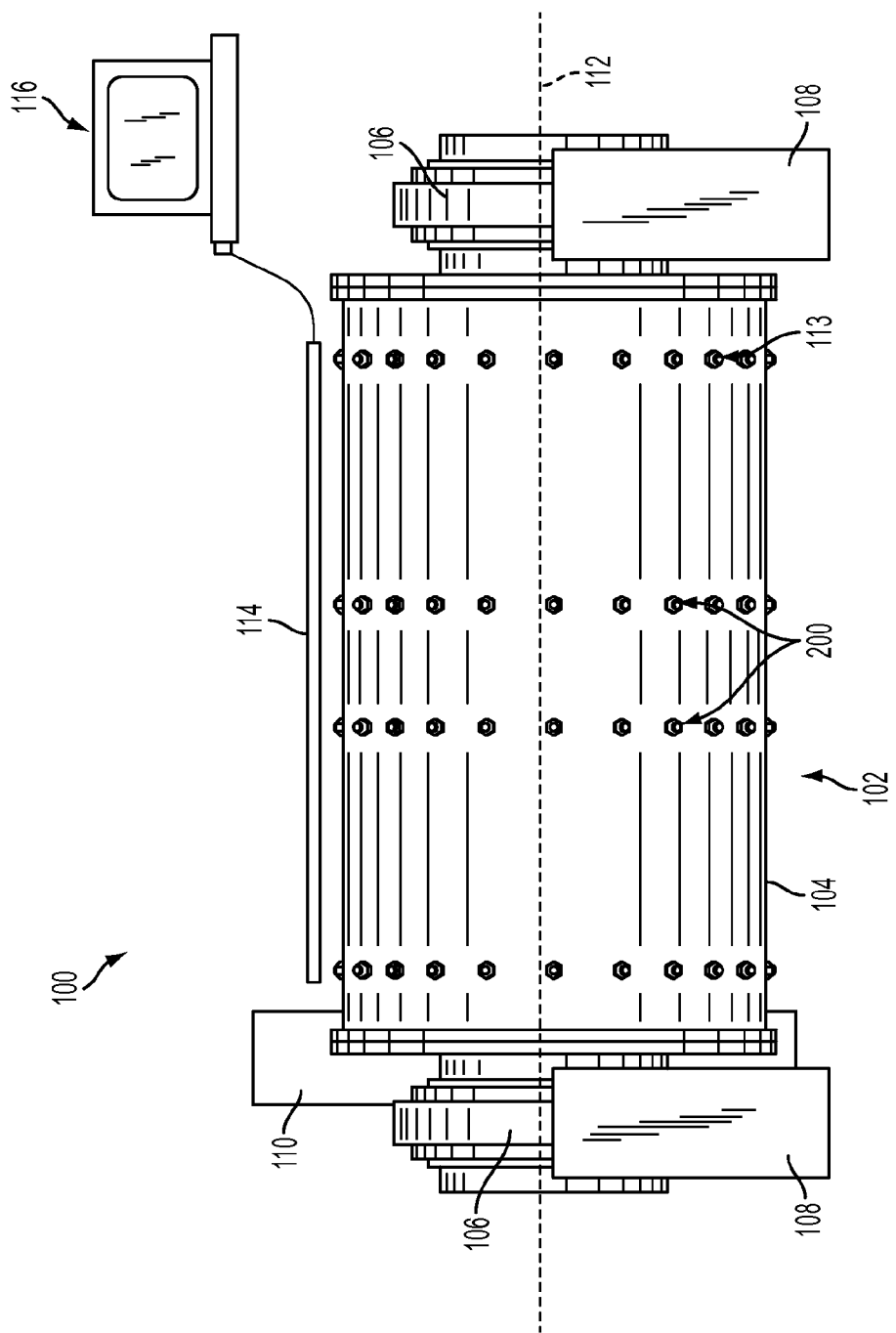
FIG. 1 is a longitudinal schematic view of an assembly, in accordance with an embodiment of the disclosure.

Wear indication devices are disclosed, as are assemblies including wear indication devices, and methods of detecting wear to a component of an assembly. In some embodiments, a wear indication device includes at least one sensor located within at least one opening at least partially extending through an outer body. The sensor may include at least one probe and at least electronic device operatively associated with the probe. Multiple wear indication devices may at least partially attach at least one wear-resistant structure to at least one internal surface of a vessel of an assembly (e.g., a milling assembly, a grinding assembly, etc.). Each of the wear indication devices may be substantially the same, or at least one of the wear indication devices may be different than at least one other of the wear indication devices. During use and operation of the vessel, the wear indication devices and the wear-resistant structure may be subjected to wear. The sensors of the wear indication devices may indicate when the wear indication devices (and, hence the wear-resistant structure associated therewith) exhibit predetermined amounts of wear. Maintenance may then be performed on the vessel and/or the components thereof (e.g., the wear-resistant structure and one or more of the wear indication devices may be replaced), as desired, before damage to the vessel itself is incurred. Optionally, at least one of the wear indication devices may also be configured and operated to provide additional information associated with the operation of the vessel. The wear indication devices, assemblies, and methods of the disclosure may provide enhanced efficiency, reduced costs, and increased safety relative to conventional devices, assemblies, and methods associated with milling operations.

In the following detailed description, reference is made to the accompanying drawings that depict, by way of illustration, specific embodiments in which the disclosure may be practiced. However, other embodiments may be utilized, and structural, logical, and configurational changes may be made without departing from the scope of the disclosure. The illustrations presented herein are not meant to be actual views of any particular material, component, apparatus, assembly, system, or method, but are merely idealized representations that are employed to describe embodiments of the disclosure. The drawings presented herein are not necessarily drawn to scale. Additionally, elements common between drawings may retain the same numerical designation.

Although some embodiments of the disclosure are depicted as being used and employed in particular assemblies and components thereof, persons of ordinary skill in the art will understand that the embodiments of the disclosure may be employed in any assembly and/or component thereof where it is desirable to enhance wear detection (e.g., sensing, indication, etc.) relating to the assembly and/or component thereof during use and operation. By way of non-limiting example, embodiments of the disclosure may be employed in any equipment associated with processing a mined material (e.g., ore) and subject to degradation (e.g., physical degradation and/or chemical degradation) including, but not limited to, rotary mills, ball mills, rod mills, semiautogenous (SAG) mills, autogenous (AG) mills, crushers, impactors, grinders, hoppers, bins, chutes, and other components associated with processing (e.g., grinding, crushing, pulverizing, etc.) a mined material, as known in the art.

As used herein, the singular forms "a," "and" and "the" are intended to include the plural forms as well, unless the context clearly indicates otherwise.

As used herein, the term "and/or" includes any and all combinations of one or more of the associated listed items.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures. For example, if materials in the figures are inverted, elements described as "below" or "beneath" or "under" or "on bottom of" other elements or features would then be oriented "above" or "on top of" the other elements or features. Thus, the term "below" can encompass both an orientation of above and below, depending on the context in which the term is used, which will be evident to one of ordinary skill in the art. The materials may be otherwise oriented (e.g., rotated 90 degrees, inverted, flipped) and the spatially relative descriptors used herein interpreted accordingly.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

FIG. 1 is a longitudinal schematic view of an assembly 100 for use in accordance with an embodiment of the disclosure. The assembly 100 may be configured and operated to break down (e.g., grind, crush, pulverize, etc.) a mined material, such as ore. As shown in FIG. 1, the assembly 100 may include a vessel 102 (e.g., grinder, mill, etc.) formed of and including a shell 104. Bearings 106 and support structures 108 may be located at opposing lateral ends of the vessel 102, and at least one rotation device 110 (motor, drive, etc.) may be positioned and configured to rotate the vessel 102 about an axis 112 thereof. Wear indication devices 200 extend into an internal chamber of the vessel 102. The wear indication devices 200 are positioned and configured to attach (e.g., couple, bond, adhere, etc.) one or more components (e.g., wear-resistant structures) of the vessel 102 to at least one internal surface of the shell 104, and are also positioned and configured to obtain and communicate (e.g., relay, transmit, send, transfer, etc.) information related to the use and operation of the vessel 102, as described in further detail below. Optionally, at least one bolt 113 may also be positioned and configured to attach one or more components of the vessel 102 to the at least one internal surface of the shell 104. The at least one bolt 113 may be provided in addition to the wear indication devices 200, and/or may be provided in lieu of one or more of the wear indication devices 200, so long as at least one of the wear indication devices 200 is included in the assembly 100. In addition, at least one receiving device 114 may be positioned and configured to receive the information from the wear indication devices 200, and to communicate the information to one or more other devices 116 (e.g., computers) configured and operated to analyze, display, and/or act upon the information, as also described in further detail below.

Figure 2:
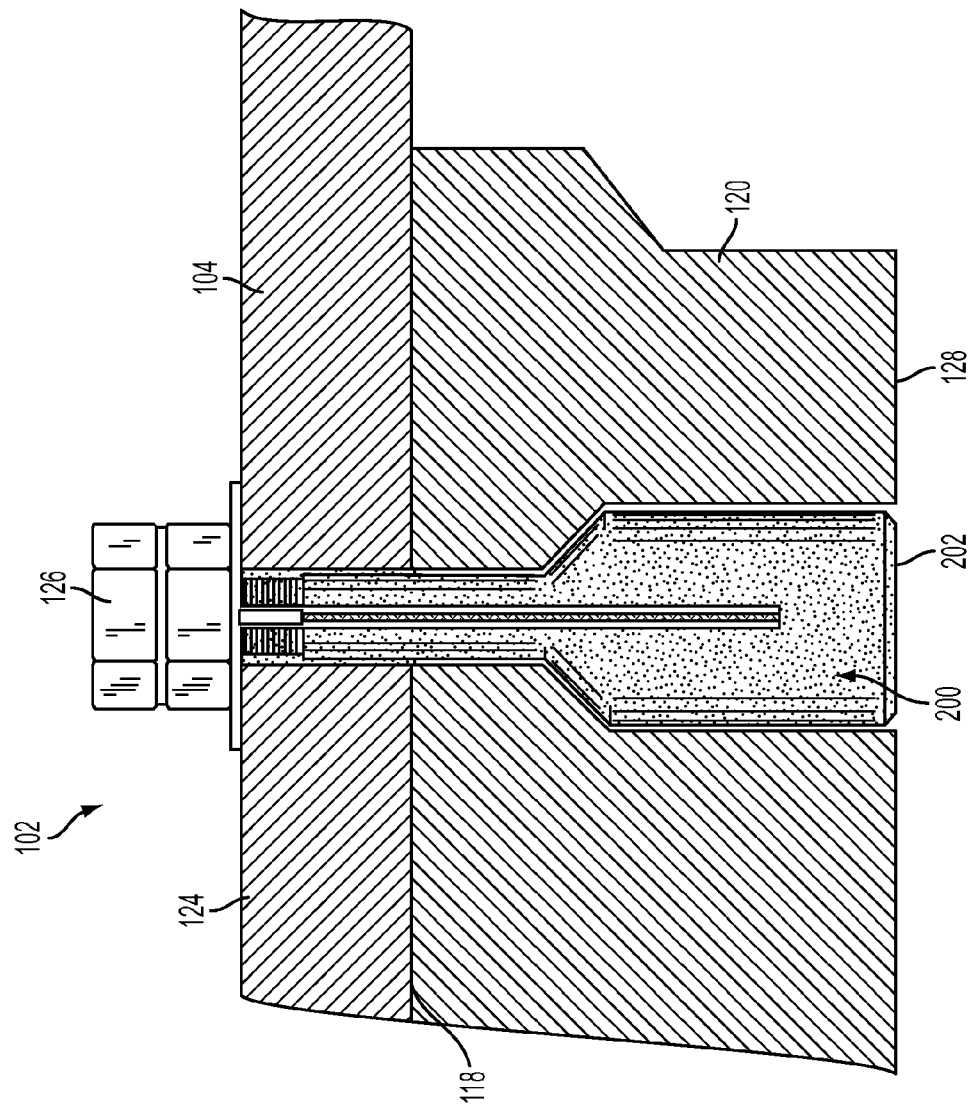
FIG. 2 is a partial, transverse cross-sectional view of a portion of the assembly depicted in FIG. 1, in accordance with an embodiment of the disclosure.

FIG. 2 is a partial, transverse cross-sectional view of the vessel 102 depicted in FIG. 1 at a location proximate one of the wear indication devices 200. As shown in FIG. 2, at least one internal surface 118 of the shell 104 of the vessel 102 is covered (e.g., lined) with at least one wear-resistant structure 120 (e.g., wear plate, wear liner, etc.). The wear-resistant structure 120 may be formed of and include at least one material that is resistant to physical degradation (e.g., abrasion, erosion, etc.) and/or chemical degradation (e.g., corrosion). The wear-resistant structure 120 may have any geometric configuration (e.g., shape and size) sufficient to substantially protect the shell 104 of the vessel 102 from degradation. In some embodiments, the internal surface 118 of the shell 104 is covered with a plurality of wear-resistant structures 120 positioned adjacent (e.g., laterally adjacent and/or longitudinally adjacent) to one another within an internal chamber 122 of the vessel 102, each of the plurality of wear-resistant structures 120 independently exhibiting a desired shape, size, and material composition.

Referring collectively to FIGS. 1 and 2, the wear indication devices 200 may at least partially attach (e.g., couple, affix, etc.) the wear-resistant structure 120 to the internal surface 118 of the shell 104. The wear indication devices 200 may be positioned in openings extending through each of the shell 104 and the wear-resistant structure 120. As depicted in FIG. 2, a portion (e.g., a threaded portion) of each of the wear indication devices 200 may protrude beyond an external surface 124 of the shell 104, and may be coupled to a retention device 126 (e.g., nut) overlying the external surface 118 of the shell 104. In addition, a first surface 202 of each of the wear indication devices 200 may be substantially co-planar with at least one internal surface 128 of the wear-resistant structure 120.

Figure 3:
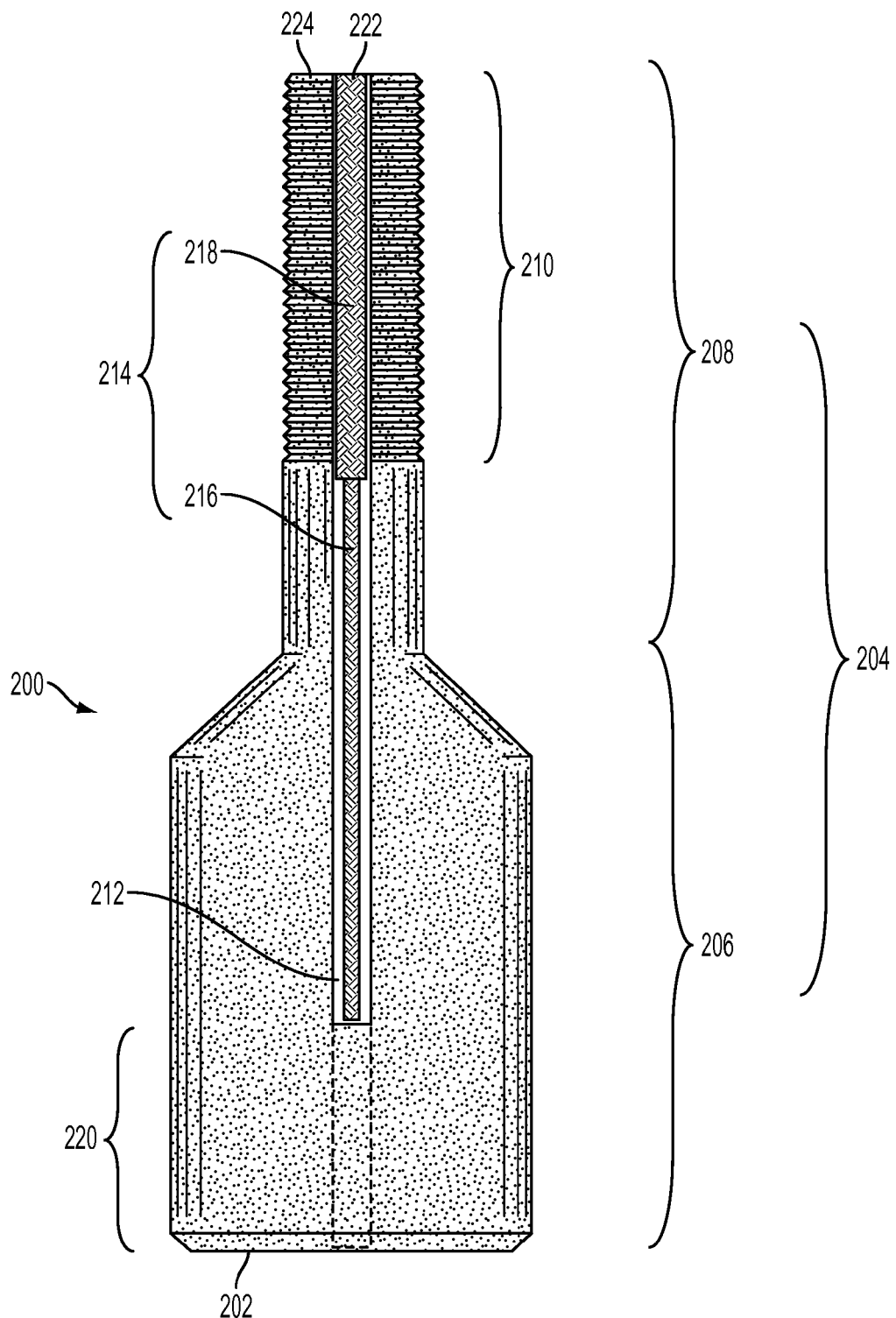
FIG. 3 is a transverse cross-sectional view of a wear indication device, in accordance with an embodiment of the disclosure.

FIG. 3 is a partial cross-sectional view of the wear indication device 200 depicted in FIG. 2. As shown in FIG. 3, the wear indication device 200 includes an outer body 204, and a sensor 214 at least partially (e.g., substantially) surrounded by the outer body 204. The outer body 204 may be formed of and include any material capable of retaining the wear-resistant structure 120 (FIG. 2) against the inner surface 118 (FIG. 2) of the shell 104 (FIG. 2) of the vessel 102 (FIG. 2) during use and operation of the vessel 102. In some embodiments, the outer body 204 is formed of and includes at least one of a metal and a metal alloy (e.g., steel). The outer body 204 may include a head region 206 and a stem region 208. The head region 206 may be integral and continuous with the stem region 208, and may extend outwardly beyond a lateral periphery of the stem region 208. At least a portion 210 of the stem region 208 may be threaded (e.g., for coupling with the retention device 126 shown in FIG. 2). In addition, at least one opening 212 (e.g., bore, via, recess, etc.) at least partially extends through the outer body 204. As depicted in FIG. 3, in some embodiments, the opening 212 comprises a blind opening, which may also be characterized as a bore, extending completely through the stem region 208 and partially into the head region 206. In additional embodiments, the opening 212 comprises a through opening extending completely through each of the stem region 208 and the head region 206, as shown by broken lines in FIG. 3. The opening 212 may exhibit any desired lateral cross-sectional shape including, but not limited to, a circular shape, a tetragonal shape (e.g., square, rectangular, trapezium, trapezoidal, parallelogram, etc.), a triangular shape, a semicircular shape, an ovular shape, an elliptical shape, or a combination thereof. In addition, the opening 212 may exhibit substantially the same lateral dimensions (e.g., the same length and width, the same diameter, etc.) through-out the depth thereof, or the lateral dimensions of the opening 212 may vary through-out the depth thereof (e.g., an upper portion of the opening 212 may have at least one of a different length, a different width, and a different diameter than a lower portion of the opening 212). The sensor 214 is positioned within the opening 212. A portion of the opening 212 not occupied by the sensor 214 may be at least partially (e.g., substantially) filled with another material, such as a self-hardening compound (e.g., an epoxy resin, such as a non-conductive epoxy resin).

The sensor 214 includes at least one probe 216 and at least one electronic device 218 connected to the at least one probe 216. The probe 216 may be any structure configured and positioned to identify (e.g., signal, communicate, etc.) a change in at least one of the geometric configuration (e.g., size, shape, etc.) of the opening 212, and the environmental conditions (e.g., material composition, pressure, pH, temperature, etc.) present within the opening 212. For example, and without limitation, the probe 216 may exhibit a size, shape, material composition, and position within the opening 212 facilitating detection of at least one of a reduction in the depth of the opening 212, a modification of the shape of the opening 212, and a change in the material composition (e.g., water content) within the opening 212. Accordingly, the probe 216 may be used to identify when the outer body 204 has exhibited a predetermined amount of wear, such as when from about 10 percent to about 80 percent of the outer body 204 has been removed (e.g., worn away, abraded away, etc.), when from about 20 percent to about 70 percent of the outer body 204 has been removed, or when from about 30 percent to about 60 percent of the outer body 204 has been removed.

As a non-limiting example, the probe 216 may comprise an at least partially conductive structure (e.g., a conductive wire, a conductive rod, a conductive cylinder, etc.). The probe 216, the electronic device 218, and the outer body 204 of the wear indication device 200 may form an open electrical circuit under the initial geometric configuration of the opening 212, and may form a closed electrical circuit upon modification of the opening 212 during use and operation of the vessel 102 (FIG. 1). The probe 216 may initially be electrically isolated from a conductive material (e.g., metal, metal alloy, etc.) of the outer body 204 of the wear indication device 200, but may become electrically coupled to the conductive material of the outer body 204 after the outer body 204 sustains a predetermined amount of wear. A conductive material (e.g., metal wire, metal rod, metal cylinder, etc.) of the probe 216 may initially be offset from surfaces (e.g., a bottom surface, side surfaces) of the outer body 204 defining the opening 212, but after a capping portion 220 of the head region 206 of the outer body 204 is removed (e.g., worn away, abraded away, etc.) the conductive material of the probe 216 may come into physical contact with the conductive material of the outer body 204 and complete an electrical circuit. For example, structures (e.g., ore, charge, etc.) moving within the internal chamber 122 (FIG. 2) of the vessel 102 during the use and operation thereof may substantially remove at least the capping portion 220 of the head region 206, and may also deform remaining conductive material of the head region 206 to contact the conductive material of the probe 216. In some embodiments, the probe 216 is selected to initially have a length and a width preventing the probe 216 from physically contacting the surfaces of the outer body 204 defining the opening 212. In additional embodiments, an electrically insulating material (e.g., an insulating sheath, an isolating filler material, etc.) is disposed between a conductive material of the probe 216 and the surfaces of the outer body 204 defining the opening 212.

As another non-limiting example, the probe 216 may comprise a wick. The electronic device 218 may form an open electrical circuit under the initial geometric configuration of the opening 212, and may form a closed electrical circuit after a conductive liquid (e.g., water) is provided (e.g., wicked, transported, etc.) thereto by the probe 216 upon modification of the opening 212 during use and operation of the vessel 102 (FIG. 1). The opening 212 and the probe 216 may initially be substantially free of the conductive liquid, but may become infiltrated with the conductive liquid after the outer body 204 sustains a predetermined amount of wear. For example, structures (e.g., ore, charge, etc.) moving within the internal chamber 122 (FIG. 2) of the vessel 102 during the use and operation thereof may substantially remove at least the capping portion 220 of the head region 206, permitting at least some water present within the internal chamber 122 to enter into the opening 212 and contact the probe 216. The probe 216 may then transport (e.g., wick) the water to the electronic device 218 to complete an electrical circuit in the electronic device 218.

As an additional non-limiting example, the probe 216 may comprise a sealed structure. The sealed structure may comprise an at least partially hollow structure formed of and including at least one of a flexible material (e.g., metal foil, plastic, rubber, etc.), and a brittle material (e.g., a ceramic material, silicon, glass, sapphire, quartz, etc.). The probe 216 may exhibit an initial geometric configuration under the initial geometric configuration of the opening 212, and may deform (e.g., warp, bend, etc.), rupture (e.g., break), and/or degrade (e.g., wear away) upon modification of the opening 212 during use and operation of the vessel 102 (FIG. 1). The modification of the initial geometric configuration of the probe 216 may result in a change in an internal pressure of the probe 216, which may be detected by the electronic device 218. In some embodiments, the probe 216 comprises a sealed annular structure having an internal chamber under negative pressure (e.g., vacuum) or positive pressure (e.g., well above ambient). The sealed annular structure may rupture after the capping portion 220 of the head region 206 of the outer body 204 is removed (e.g., worn away, abraded away, etc.) during use and operation of the vessel 102, and/or if the outer body 204 breaks (e.g., cracks, splits, etc.) during use and operation of the vessel 102.

With continued reference to FIG. 3, the electronic device 218 may be formed of and include an integrated circuit (IC) configured and operated to respond to a change in the probe 216. The electronic device 218 is operatively associated with the probe 216, and may include at least one power supply (e.g., battery) and at least one output device (e.g., light-emitting diode, audio transducer, wireless transmitter, etc.). The electronic device 218 may also include other structures and/or devices, such as one or more sensing modules (e.g., pressure sensing modules, temperature sensing modules, audio sensing modules, acceleration sensing modules, velocity sensing modules, radiation sensing modules, moisture sensing modules, pH sensing modules, etc.), input devices (e.g., wireless receivers), memory devices, switches, resistors, capacitors, inductors, diodes, cases, etc. Upon change in the state of probe 216 and/or at least one component (e.g. switch, sensing module, etc.) of the electronic device 218, the electronic device 218 may activate (e.g., initiate) the output device thereof, conveying information to the receiving device 114 (FIG. 1) of the assembly 100 (FIG. 1), as described in further below.

As previously discussed, in some embodiments, the wear indication device 200 is configured and operated such that a change in the probe 216 of the electronic device 218 completes (e.g., closes) at least one electrical circuit within the wear indication device 200. The completed electrical circuit may be formed within the electronic device 218 alone, may formed between two or more of the probe 216, the electronic device 218, and the outer body 204 of the wear indication device 200, or a combination thereof. The completed electrical circuit may activate the output device of the electronic device 218. For example, if the output device of the electronic device 218 comprises at least one of a light-emitting diode (LED), an audio transducer, and a wireless transmitter, completing the electrical circuit may initiate the output device to produce at least one of light, sound, and a wireless transmission, respectively. In additional embodiments, the wear indication device 200 is configured and operated such that a change in the probe 216 of the electronic device 218 opens (e.g., shorts) at least one electrical circuit within the wear indication device 200. The open electrical circuit may be formed within the electronic device 218 alone, may formed between two or more of the probe 216, the electronic device 218, and the outer body 204 of the wear indication device 200, or a combination thereof. The open electrical circuit may deactivate the output device of the electronic device 218. For example, if the output device of the electronic device 218 comprises at least one of an LED, an audio transducer, and a wireless transmitter, opening the electrical circuit may turn off the output device to terminate at least one of light, sound, and a wireless transmission, respectively. In further embodiments, the wear indication device 200 is configured and operated such that a change in the probe 216 of the electronic device 218 initiates a switch operatively associated with each of the output device and a completed electrical circuit in the wear indication device 200 (e.g., within the electronic device 218) to initiate the output device.

The electronic device 218 may be configured and operated to sense and convey a single piece of information related to the use and operation of the vessel 102, or may be configured and operated to sense and convey multiple pieces of information related to the use and operation of the vessel 102. For example, the electronic device 218 may be configured and operated to sense and convey the amount of wear exhibited by the outer body 204 of the wear indication device 200 (and, hence, the amount of wear exhibited by the wear-resistant structure 120 (FIG. 2) adjacent to and held by the outer body 204 of the wear indication device 200) alone, or the electronic device 218 may be configured and operated to sense and convey the amount of wear exhibited by the outer body 204 of the wear indication device 200 as well as information pertaining to one or more of the velocity of the vessel 102 (FIG. 1), the movement of materials (e.g., ore, charge, etc.) within the internal chamber 122 (FIG. 2) of the vessel 102, and the composition of the materials within the internal chamber 122 (FIG. 2) of the vessel 102. If the electronic device 218 is configured and operated to sense and convey multiple pieces of information related to the use and operation of the vessel 102, the electronic device 218 may utilize a single output device to convey the different pieces of information (e.g., a single LED producing different light intensities, a single audio transducer producing different sounds and/or different audio frequencies, a single wireless transmitter transmitting different data, etc.), or may utilize multiple output devices to convey the different pieces of information (e.g., multiple LEDs producing different colors of light and/or different light intensities, multiple audio transducers producing different sounds and/or different audio frequencies, multiple wireless transmitters transmitting different data, etc.).

As shown in FIG. 3, the sensor 214, including the probe 216 and the electronic device 218, may be substantially confined within boundaries (e.g., lateral boundaries and/or longitudinal boundaries) of the opening 212 at least partially extending through the outer body 204 of the wear indication device 200. For example, an upper surface 222 of the electronic device 218 may be located within the opening 212, or may be substantially coplanar with an upper surface 224 of the stem region 208 of the outer body 204. Substantially confining the sensor 214 within the boundaries of the opening 212 may enhance safety and decrease the risk of equipment damage during use and operation of the vessel 102 (FIG. 1) (e.g., reducing the risk of components of the sensor 214, such as the electronic device 218, detaching and projecting during axial rotation of the vessel 102). In additional embodiments, a portion of the sensor 214 (e.g., a portion of the electronic device 218, such as a portion of the output device thereof) may project beyond the boundaries (e.g., lateral boundaries and/or longitudinal boundaries) of the opening 212.

Figure 4:
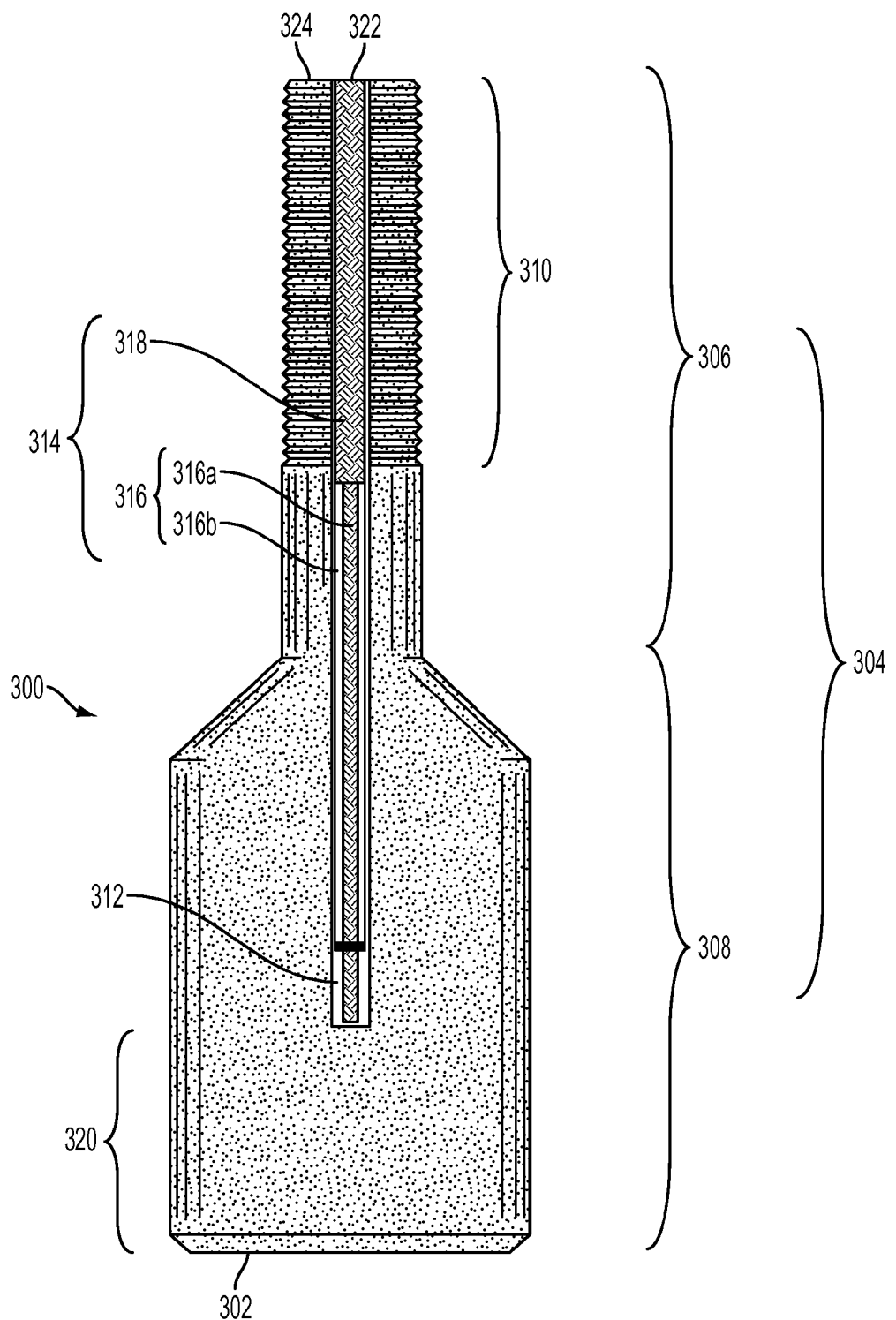
FIG. 4 is a transverse cross-sectional view of a wear indication device, in accordance with another embodiment of the disclosure.

FIG. 4 illustrates a partial cross-sectional view of a wear indication device 300, in accordance with additional embodiments of the disclosure. To avoid repetition, not all features shown in FIG. 4 are described in detail herein. Rather, unless described otherwise below, features designated by a reference numeral that is a 100 increment of the reference numeral of a feature described previously in relation to FIG. 3 will be understood to be substantially similar to the feature described previously.

As shown in FIG. 4, the wear indication device 300 may include a sensor 314 disposed within an opening 312 at least partially extending through an outer body 304. The sensor 314 may be formed of and include a plurality of probes 316, and at least one electronic device 318. Each of the plurality of probes 316 may be substantially the same (e.g., exhibit substantially the same size, shape, and material composition), or at least one of the plurality of probes 316 may be different than (e.g., exhibit at least one of a different size, a different shape, and a different material composition) at least one other of the plurality of probes 316. For example, a first probe 316a and a second probe 316b may each comprise an at least partially conductive structure (e.g., a conductive e, a conductive rod, a conductive cylinder, etc.), but the first probe 316a may extend to a different depth (e.g., have a different length) within the opening 312 than the second probe 316b. The different lengths of the first probe 316a and the second probe 316b may permit the wear indication device 300 to detect different amounts of wear to the outer body 304 of the wear indication device 300 (and, hence, different amounts of wear to the wear-resistant structure 120 (FIG. 2) adjacent to and held by the outer body 304 of the wear indication device 300). As a non-limiting example, the length of the first probe 316a may permit the sensor 314 to convey when about 20 percent of the outer body 304 has been removed (e.g., worn away, abraded away, etc.), and the length of the second probe 316b may allow the sensor 314 to convey when about 40 percent of the outer body 304 has been removed. The use of multiple probes 316 may be employed to empirically determine a wear rate of wear indication device 300, which wear rate may be correlated to wear rates of other structures. In additional embodiments, the first probe 316a and the second probe 316b may comprise different structures. For example, the first probe 316a may comprise one of an at least partially conductive structure, a wick, and a sealed structure, and the second probe 316b may comprise another of an at least partially conductive structure, a wick, and a sealed structure. The different structures of the first probe 316a and the second probe 316b may permit the wear indication device 300 to detect different forms of damage to the wear indication device 300. As a non-limiting example, if the first probe 316a comprises an at least partially conductive structure and the second probe 316b comprises a sealed structure, the first probe 316a may permit the sensor 314 to convey when a predetermined amount (e.g., about 20 percent, about 30 percent, about 40 percent, about 50 percent, about 60 percent, etc.) of the outer body 304 has been removed (e.g., worn away, abraded away, etc.) and the second probe 316b may permit the sensor 314 to convey if the outer body 304 prematurely breaks (e.g., cracks, splits, etc.) during use and operation of the vessel 102 (FIG. 1).

Each of the plurality of probes 316 may be operatively associated with the same output device of the electronic device 318, or at least one of the plurality of probes 316 may be operatively associated with a different output device of the electronic device 318 than at least one other of the plurality of probes 316. For example, each of the plurality of probes 316 may be operatively associated with a single output device (e.g., a single LED, a single audio transducer, a single wireless transmitter, etc.) configured and operated to provide different outputs (e.g., different light intensities; different sounds and/or different audio frequencies; different wireless data transmissions; etc.) for different probes (e.g., the first probe 316a, the second probe 316b, etc.) of the plurality of probes 316. As another example, different probes (e.g., the first probe 316a, the second probe 316b, etc.) of the plurality of probes 316 may be operatively associated with different output devices (e.g., different LEDs, different audio transducers, different wireless transmitters, etc.) configured and operated to provide different outputs (e.g., different light intensities and/or light colors; different sounds and/or different audio frequencies; different wireless data transmissions; etc.).

Figure 5:
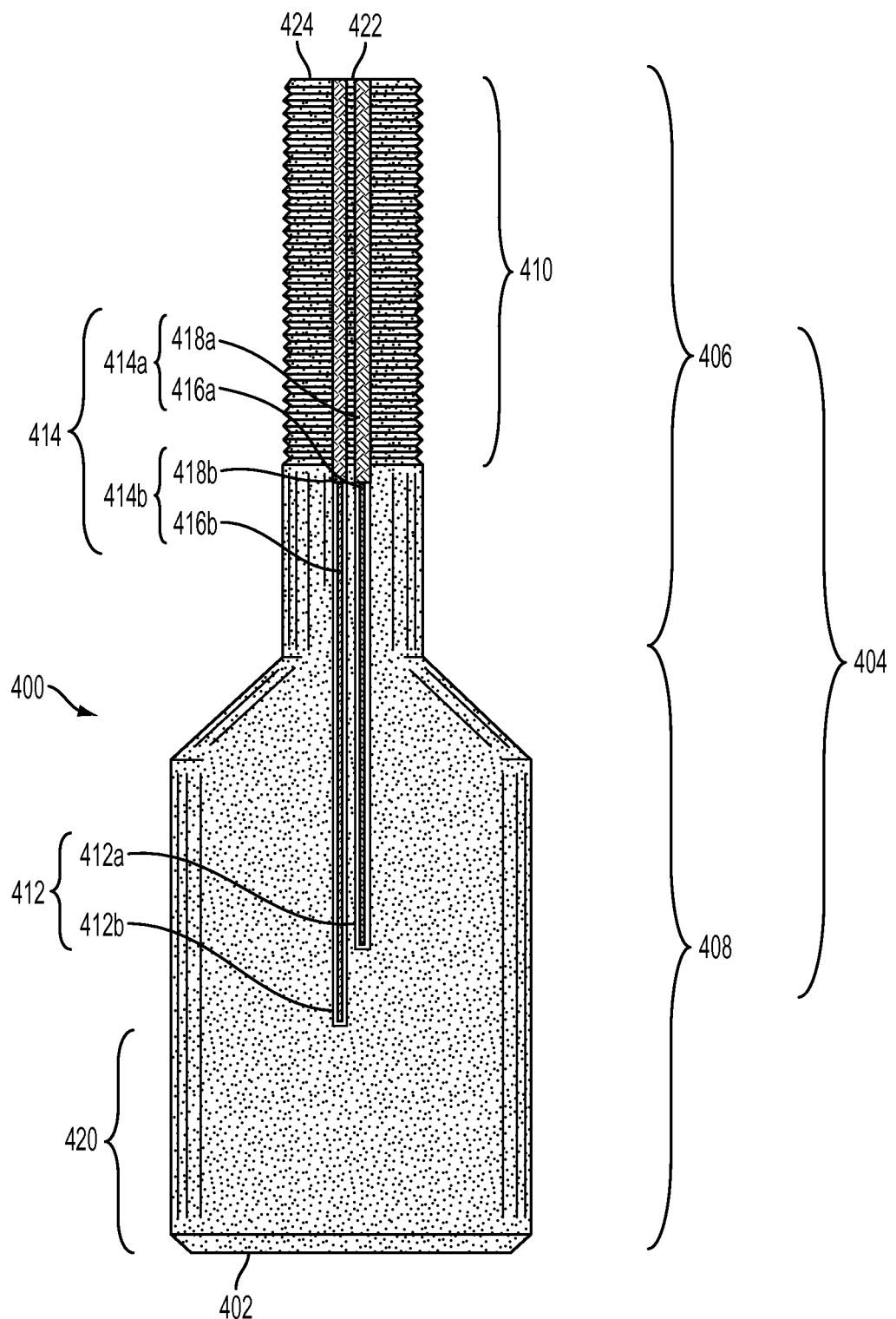
FIG. 5 is a transverse cross-sectional view of a wear indication device, in accordance with an additional embodiment of the disclosure.

FIG. 5 illustrates a partial, transverse cross-sectional view of a wear indication device 400, in accordance with further embodiments of the disclosure. To avoid repetition, not all features shown in FIG. 5 are described in detail herein. Rather, unless described otherwise below, features designated by a reference numeral that is a 100 increment of the reference numeral of a feature described previously in relation to FIG. 3 will be understood to be substantially similar to the feature described previously.

As shown in FIG. 5, the wear indication device 400 may include a plurality of sensors 414 disposed within a plurality of openings 412 at least partially extending through an outer body 404. Each of the plurality of openings 412 may extend to substantially the same depth within the outer body 404, or at least one of the plurality of openings 412 may extend to a different depth within the outer body 404 than at least one other of the plurality of openings 412. For example, as depicted in FIG. 5, a first opening 412a may exhibit a shallower depth than a second opening 412b (i.e., the second opening 412b may extend deeper into the outer body 404 than the first opening 412a). In addition, each of the plurality of openings 412 may independently contain at least one of the plurality of sensors 414. For example, a first sensor 414a including a first probe 416a and a first electronic device 418a may be located within the first opening 412a, and a second sensor 414b including a second probe 416b and a second electronic device 418b may be located within the second opening 412b. Each of the plurality of sensors 414 may be substantially the same, or at least one of the plurality of sensors 414 may be different than at least one other of the plurality of sensors 414. For example, the first probe 416a of the first sensor 414a may be the same as (e.g., exhibit substantially the same size, shape, and material composition) or different than (e.g., exhibit at least one of a different size, a different shape, and a different material composition) the second probe 416b of the second sensor 414b, and/or the first electronic device 418a of the first sensor 414a may be the same as or different than the second electronic device 418*b* of the second sensor 414*b*. In some embodiments, the first probe 416*a* of the first sensor 414*a* and the second probe 416*b* of the second sensor 414*b* each comprise an at least partially conductive structure a conductive wire, a conductive rod, a conductive cylinder, etc.), but the first probe 416*a* extends to a different depth (e.g., the depth of the first opening 412*a*) within the outer body 404 than the second probe 416*b*. In additional embodiments, the first probe 416*a* of the first sensor 414*a* and the second probe 416*b* of the second sensor 414*b* comprise different structures than one another (e.g., the first probe 416*a* may comprise one of an at least partially conductive structure, a wick, and a sealed structure, and the second probe 416*b* may comprise another of an at least partially conductive structure, a wick, and a sealed structure). In further embodiments, the first electronic device 418*a* of the first sensor 414*a* and the second electronic device 418*b* of the second sensor 414*b* are configured differently than one another (e.g., may include different output devices, such as at least one of different LEDs, different audio transducers, different wireless transmitters; may include similar output devices that are configured to provide different outputs, such as different light intensities, different sounds and/or different audio frequencies, different wireless data transmissions; etc.).

Referring again to FIG. 1, the receiving device 114 may be any device positioned and configured to detect (e.g., sense) and receive the output (e.g., light, sound, wireless transmission, etc.) from the wear indication devices 200 (and/or the wear indication devices 300, 400 described in relation to FIGS. 4 and 5, either or both of which may be substituted for any or all of the wear indication devices 200 described in relation to FIGS. 1 and 2). The receiving device 114 may be selected and positioned at least partially based on the configuration of the wear indication devices 200 (and/or the wear indication devices 300, 400). For example, if the output device of the electronic device 218 (FIG. 3) of the sensor 214 (FIG. 3) of one or more of the wear indication devices 200 comprises at least one LED, the receiving device 114 may comprise a light sensor positioned and configured to detect radiation (e.g., light) emitted by the LED. As another example, if the output device of the electronic device 218 of the sensor 214 of one or more of the wear indication devices 200 comprises at least one audio transducer, the receiving device 114 may comprise an audio sensor positioned and configured to detect sound at one or more frequencies emitted by the audio transducer, which one or more frequencies may be selected to avoid ambient noise experienced during processing operations. As an additional example, if the output device of the electronic device 218 of the sensor 214 of one or more of the wear indication devices 200 comprises at least one wireless transmitter, the receiving device 114 may comprise a wireless receiver positioned and configured to detect and receive wireless communications from the wireless transmitter. The receiving device 114 may have any geometric configuration (e.g., size, shape, etc.) permitting the receiving device 114 to detect output from the wear indication devices 200 individually and/or collectively. The receiving device 114 may communicate with one or more of the other devices 116 (e.g., computers), where the information conveyed by the wear indication devices 200 may be analyzed and acted upon. Optionally, the receiving device 114 may also be configured and operated to output information to one or more of the wear indication devices 200. For example, if the electronic device 218 (FIG. 3) of at least one of the wear indication devices 200 includes a receiving device, the receiving device 114 may be configured and operated to relay information from one or more of the other devices 116 to the at least one wear indication device 200 (e.g., to activate at least one specific sensor and/or at least one specific sensing module present in the at least one wear indication device 200).

With continued reference to FIG. 1, the vessel 102 may exhibit any desired distribution of the wear indication devices 200 (and/or the wear indication devices 300, 400 described in relation to FIGS. 4 and 5). Each of the wear indication devices 200 (or the wear indication devices 300, 400) may be substantially the same and may be uniformly (e.g. regularly, evenly, etc.) spaced relative to the other wear indication devices 200 (or the other wear indication devices 300, 400), or at least one of the wear indication devices 200 (and/or at least one of the wear indication devices 300, 400) may be different than at least one other of the wear indication devices 200 (and/or at least one other of the wear indication devices 300, 400) and/or may be non-uniformly (e.g., non-regularly, non-evenly, etc.) spaced relative to the other wear indication devices 200 (and/or the other wear indication devices 300, 400). As a non-limiting example, the probe 216 (FIG. 3) of at least one of the wear indication devices 200 may be different than (e.g., exhibit at least one of a different size, a different shape, and a different material composition). In some embodiments, the wear indication devices 200 (and/or the wear indication devices 300, 400) are selected and spaced at least partially based on analysis of historical wear patterns and/or other information for the vessel 102.

Therefore, with reference to FIGS. 1 through 3, and in accordance with embodiments of the disclosure, a method for detecting wear to at least one wear-resistant structure 120 within a vessel 102 (e.g., mill) of an assembly 100 (e.g., milling assembly, grinding assembly, etc.) during use and operation of the assembly 100 may include forming the wear indication devices 200 (and/or the wear indication devices 300, 400 previously described in relation to FIGS. 4 and 5). The wear-resistant structure 120 may be positioned and attached to a shell 104 of the vessel 102 using the wear indication devices 200, and the vessel 102 may be used (e.g., axially rotated) to process (e.g., grind, pulverize, crush, etc.) one or more materials (e.g., ore structures) in an internal chamber 122 thereof. The processing of the materials may degrade (e.g., wear, abrade, etc.) exposed portions of the wear indication devices 200 and wear-resistant structure 120 within the internal chamber 122. After at least one of the wear indication devices 200 exhibits a predetermined amount of wear, a sensor 214 of the wear indication device 200 sends an output (e.g., light, sound, a wireless transmission, etc.) to a receiving device 114, which may then communicate with one or more other devices 116. The communication may be analyzed and further actions, for example, preventive maintenance, may be performed (e.g., the vessel 102 may be shut down, and the wear-resistant structure 120 and the wear indication devices 200 may be replaced), as desired. In addition, one or more of the wear indication devices 200 may be configured and operated to detect and relay other information (e.g., vessel rotation speed, material movement, material composition, etc.) associated with the processing of the material. The additional information may also be analyzed and/or acted upon, as desired.

The devices, assemblies, and methods of the disclosure provide enhanced efficiency, reduced costs, and improved safety as compared to the devices, assemblies, and methods conventionally associated with processing (e.g., grinding, pulverizing, crushing, etc.) a mined material (e.g., ore). For example, the wear indication devices 200, 300, 400 of the disclosure facilitate the simple and cost-effective detection of wear to wear-resistant structures 120 lining a shell 104 of a vessel 102, substantially removing uncertainties regarding the continued durability of the wear-resistant structures 120 during processing of a mined material, mitigating concerns with respect to damage to the vessel 102 during processing of the mined material, and greatly reducing costs (e.g., down time costs, labor costs, damaged equipment costs, etc.) associated with conventional wear inspection processes. The wear indication devices 200, 300, 400 of the disclosure are also easy to produce, to handle, to place, and to secure to components (e.g., the shell 104 of the vessel 102, the wear-resistant structure 120, etc.) of an assembly 100. In addition, the wear indication devices 200, 300, 400 of the disclosure may be configured and operated to provide other useful information (e.g., the rotational velocity of the vessel 102, the movement of materials within the vessel 102, etc.) associated with processing a mined material. Furthermore, the configurations and locations of the wear indication devices 200, 300, 400 may be tailored to particular needs and/or historical data associated with the assembly 100.

While the disclosure is susceptible to various modifications and alternative forms, specific embodiments have been shown by way of example in the drawings and have been described in detail herein. However, the disclosure is not intended to be limited to the particular forms disclosed. Rather, the disclosure is to cover all modifications, equivalents, and alternatives falling within the scope of the disclosure as defined by the following appended claims and their legal equivalents.

What is claimed is:

1. A wear indication device, comprising:
an outer body extending through and coupling a shell of a vessel and a structure covering an internal surface of the shell of the vessel, the outer body exhibiting at least one opening extending at least partially therethrough; and
at least one sensor substantially confined within boundaries of the at least one opening and comprising:
at least one probe; and
at least one electronic device operatively associated with the at least one probe and comprising:
at least one power supply; and
at least one output device.

2. The wear indication device of claim 1, wherein the outer body comprises:
a stem region; and
a head region integral with the stem region and extending outwardly beyond a lateral periphery of the stem region.

3. The wear indication device of claim 2, wherein the at least one opening extends completely through the stem region of the outer body and partially through the head region of the outer body.

4. The wear indication device of claim 1, wherein the at least one sensor is confined within boundaries of the at least one opening.

5. The wear indication device of claim 1, wherein the at least one probe is configured and positioned to identify a change in at least one of the geometric configuration of the at least one opening, and the environmental conditions within the at least one opening.

6. The wear indication device of claim 1, wherein the at least one probe comprises one or more of a wick and a sealed, at least partially hollow structure.

7. The wear indication device of claim 6, wherein the at least one probe comprises at least one insulated wire.

8. The wear indication device of claim 1, wherein the at least one probe and the at least one electronic device form an open electrical circuit prior to wear to the outer body to a depth of the at least one probe.

9. The wear indication device of claim 1, wherein the at least one electronic device further comprises one or more of a pressure sensing module, a temperature sensing module, an audio sensing module, a velocity sensing module, an acceleration sensing module, a radiation sensing module, a moisture sensing module, and a pH sensing module.

10. The wear indication device of claim 1, wherein the at least one output device of the at least one electronic device comprises at least one of a light-emitting diode, an audio transducer, and a wireless transmitter.

11. The wear indication device of claim 1, wherein at least 90 percent of the at least one sensor is confined within lateral boundaries and longitudinal boundaries of the least one opening.

12. The wear indication device of claim 1, wherein the at least one output device of the at least one electronic device comprises at least one light-emitting diode.

13. The wear indication device of claim 1, wherein the at least one electronic device further comprises one or more of an audio sensing module and a velocity sensing module.

14. An assembly comprising:
a vessel comprising a shell;
at least one structure covering at least one internal surface of the shell of the vessel; and
one or more wear indication devices extending through and coupling the shell of the vessel and the at least one structure, each of the one or more wear indication devices independently comprising:
an outer body exhibiting at least one opening extending at least partially therethrough; and
at least one sensor substantially confined within boundaries of the at least one opening and comprising:
at least one probe; and
at least one electronic device operatively associated with the at least one probe and comprising:
at least one power supply; and
at least one output device.

15. The assembly of claim 14, wherein the one or more wear indication devices comprises a plurality of wear indication devices, and the at least one sensor of at least one of the plurality of wear indication devices is different than the at least one sensor of at least one other of the plurality of wear indication devices.

16. The assembly of claim 14, wherein the one or more wear indication devices comprises a plurality of wear indication devices, the at least one probe of at least one of the plurality of wear indication devices comprises at least one insulated wire, and the at least one probe of at least one other of the plurality of wear indication devices comprises at least one of a wick and a sealed, at least partially hollow structure.

17. The assembly of claim 14, wherein the one or more wear indication devices comprises a plurality of wear indication devices, the at least one probe of at least one of the plurality of wear indication devices comprises at least one partially conductive structure, and wherein the at least one probe of at least one other of the plurality of wear indication devices comprises at least one other partially conductive structure exhibiting at least one of a different size, a different shape, and a different material composition than the at least one partially conductive structure.

18. The assembly of claim 14, further comprising at least one receiving device positioned and configured to detect and receive output from the at least one output device of at least one of the one or more wear indication devices.

19. A method of detecting wear to a component of an assembly, comprising:
  positioning at least one wear indication device within at least one opening extending through a shell of a vessel and at least one structure covering an internal surface of the shell, the at least one wear indication device comprising:
    an outer body exhibiting at least one recess extending at least partially therethrough; and
    at least one sensor substantially confined within boundaries of the at least one recess and comprising:
      at least one probe; and
      at least one electronic device operatively associated with the at least one probe and comprising:
        at least one power supply; and
        at least one output device;
  at least partially attaching the at least one structure to the vessel using the at least one wear indication device;
  removing a portion of the at least one wear indication device responsive to at least one of physical degradation and chemical degradation incurred during processing of a material with the vessel; and
  producing an output with the at least one sensor of the at least one wear indication device after removing the portion of the at least one wear indication device.

20. The method of claim 19, wherein positioning at least one wear indication device within at least one opening extending through a shell of a vessel and at least one structure comprises positioning a plurality of wear indication devices within a plurality of openings extending through the shell of the vessel and the at least one structure.

21. The method of claim 20, wherein positioning a plurality of wear indication devices within a plurality of openings extending through the shell of the vessel and the at least one structure comprises selecting at least one of the plurality of wear indication devices to comprise at least one sensor different than at least one sensor of at least one other of the plurality of wear indication devices.

22. The method of claim 19, wherein removing a portion of the at least one wear indication device comprises removing a portion of a head region of the outer body of the at least one wear indication device to expose at least a portion of the at the least one probe of the at least one sensor of the at least one wear indication device.

23. The method of claim 19, wherein producing an output with the at least one sensor of the at least one wear indication device comprises producing at least one of light, sound, and a wireless transmission using the at least one output device of the at least one sensor.

24. The method of claim 19, wherein the at least one probe and the at least one electronic device form an open electrical circuit prior to removing the portion of the at least one wear indication device, and wherein removing the portion of the at least one wear indication device forms a closed electrical circuit between the at least one probe, the at least one electronic device, and the outer body.

* * * * *

UNITED STATES PATENT AND TRADEMARK OFFICE
CERTIFICATE OF CORRECTION

| | | |
|---|---|---|
| PATENT NO. | : 9,476,689 B2 | |
| APPLICATION NO. | : 14/304649 | |
| DATED | : October 25, 2016 | |
| INVENTOR(S) | : Daniel J. Steed and Shiloh D. Poulsen | |

It is certified that error appears in the above-identified patent and that said Letters Patent is hereby corrected as shown below:

In the Specification

| | | |
|---|---|---|
| Column 1, | Line 35, | change "vicar-resistant" to --wear-resistant-- |
| Column 9, | Line 35, | change "conductive e, a" to --conductive wire, a-- |
| Column 11, | Line 4, | change "structure a conductive" to --structure (e.g., a conductive-- |

Signed and Sealed this
Fourth Day of April, 2017

Michelle K. Lee
*Director of the United States Patent and Trademark Office*